(12) United States Patent
Grabau et al.

(10) Patent No.: US 8,807,940 B2
(45) Date of Patent: Aug. 19, 2014

(54) WIND TURBINE BLADE WITH LIFT-REGULATING MEANS IN FORM OF SLOTS OR HOLES

(75) Inventors: Peter Grabau, Kolding (DK); Stefano Bove, Lunderskov (DK)

(73) Assignee: LM Glasfiber A/S, Kolding (DK)

( * ) Notice: Subject to any disclaimer, the term of this patent is extended or adjusted under 35 U.S.C. 154(b) by 893 days.

(21) Appl. No.: 12/448,736

(22) PCT Filed: Jan. 4, 2008

(86) PCT No.: PCT/DK2008/000004
§ 371 (c)(1),
(2), (4) Date: Aug. 6, 2009

(87) PCT Pub. No.: WO2008/080407
PCT Pub. Date: Jul. 10, 2008

(65) Prior Publication Data
US 2010/0014970 A1    Jan. 21, 2010

(30) Foreign Application Priority Data

Jan. 5, 2007 (DK) ................................ 2007 00013

(51) Int. Cl.
*F03D 7/02* (2006.01)
*F03D 1/06* (2006.01)

(52) U.S. Cl.
CPC ........... *F03D 7/022* (2013.01); *F05B 2270/331* (2013.01); *F05B 2270/324* (2013.01); *Y02E 10/723* (2013.01); *Y02E 10/721* (2013.01); *F03D 7/0244* (2013.01); *F05B 2240/30* (2013.01); *F03D 1/0633* (2013.01); *F05B 2260/901* (2013.01); *F05B 2270/32* (2013.01); *F05B 2270/1011* (2013.01)
USPC .................................... 416/90 R; 416/231 B

(58) Field of Classification Search
USPC .......... 416/36, 37, 41, 42, 90 R, 93 R, 231 R, 416/231 B, 232, 235
See application file for complete search history.

(56) References Cited

U.S. PATENT DOCUMENTS 3,915,106 A * 10/1975 De Witt .......................... 114/275
4,504,192 A * 3/1985 Cyrus et al. ..................... 416/41
(Continued)

FOREIGN PATENT DOCUMENTS

| EP | 1 674 723 A2 | 6/2006 |
| GB | 2 067 247 A | 7/1981 |

(Continued)

OTHER PUBLICATIONS

Vronsky; "High Performance Cost-effective Large Wind Turbine Blades Using Air-Jet Vortex Generators"; ETSU W/41/00541/REP, 2000.

*Primary Examiner* — Ned Landrum
*Assistant Examiner* — Joshua R Beebe
(74) *Attorney, Agent, or Firm* — Nath, Goldberg & Meyer; Jerald L. Meyer; Sanjana Mangalagiri

(57) ABSTRACT

A blade for a wind turbine rotor with a hub is described. The object of the invention is to provide a wind turbine blade of the modern, aerodynamic type with improved regulating properties to enhance the adjustment of the wind turbine to various wind conditions, and where no mechanical parts are needed near the tip area. At least one slot or a number of holes arranged in at least one longitudinally extending zone, thereby allowing an interior cavity of the blade to communicate with the exterior. The amount of air emitted from the interior cavity to the exterior is also regulated to alter the aerodynamic properties of the blade.

17 Claims, 7 Drawing Sheets

(56) References Cited

U.S. PATENT DOCUMENTS

| | | |
|---|---|---|
| 4,692,095 A | 9/1987 | Lawson-Tancred |
| 4,710,101 A * | 12/1987 | Jamieson ................. 416/32 |
| 6,361,275 B1 | 3/2002 | Wobben |
| 7,143,983 B2 * | 12/2006 | McClure ................. 244/204 |
| 7,354,247 B2 * | 4/2008 | Bonnet ................. 416/90 R |
| 2004/0201220 A1 * | 10/2004 | Andersen et al. ........... 290/44 |
| 2006/0140760 A1 * | 6/2006 | Saddoughi et al. .......... 416/23 |

FOREIGN PATENT DOCUMENTS

| | | | |
|---|---|---|---|
| GB | 2186033 A * | 1/1986 | ............ F03D 1/06 |
| GB | 2 186 033 A | 8/1987 | |
| GB | 2 186 638 A | 8/1987 | |
| GB | 2 216 959 A | 10/1989 | |
| GB | 2216959 A * | 10/1989 | |
| WO | 2004099608 A1 | 11/2004 | |
| WO | 2007035758 A1 | 3/2007 | |
| WO | WO 2007035758 A1 * | 3/2007 | |

* cited by examiner

WIND TURBINE BLADE WITH LIFT-REGULATING MEANS IN FORM OF SLOTS OR HOLES

This is a National Phase Application filed under 35 U.S.C. 371 as a national stage of PCT/DK2008/000004, filed 4 Jan. 2008, an application claiming priority benefit from Denmark Application No. PA200700013, filed 5 Jan. 2007, the entire content of each of which is hereby incorporated by reference in its entirety.

TECHNICAL FIELD

The present invention relates to a blade for a wind turbine rotor with a hub, the blade extending in a longitudinal direction along a longitudinal axis and having a root area closest to the hub and a tip region furthest away from the hub, the blade along at least a portion of the longitudinal direction of the blade having an envelope, which defines an airfoil profile having, in normal operation, a pressure side and a suction side, and further having a leading edge and a trailing edge, which edges define an airfoil chord line extending between them, the blade including adjustable lift-regulating means extending in the longitudinal direction of the blade, and activating means by means of which the lift-regulating means can be adjusted and thus alter the aerodynamic properties of the blade, the lift-regulating means being adapted and arranged so that by activation of the activating means, the lift can be reduced in a zone extending in the longitudinal direction of the blade from a first position in proximity to the blade tip to a second position between the first position and the root area and this second position being variable in the longitudinal direction of the blade. The invention further relates to a wind turbine rotor including such blades, to a wind turbine and to a method of controlling such a wind turbine.

BACKGROUND

Modern wind mills, also called wind turbines or wind engines, are used to produce electricity. They are often very large structures with blades of up to and in excess of 60 meters and made from fibre-reinforced polymer structures, such as shell elements. These wind turbines are provided with control devices which may prevent an overloading of the wind turbine and the blades at wind gusts and high wind speeds. Such control devices can also be used to slowing the turbine down and bringing it to a complete halt, if the wind speed becomes too high. In addition to these devices the turbine may comprise a braking device arranged in communication with the main shaft of the wind turbine.

The control devices may be formed of pitch-controlled blades mounted such on the hub that they are able to turn about the longitudinal axis. The blades may thus be continuously adjusted to provide the lift rendering the desired power. In so-called stall-controlled wind turbines the blades are fixedly mounted on the hub and thus unable to turn about their longitudinal axis. The stall properties of the blades are used to reduce the aerodynamic lift and thus the power output.

U.S. Pat. No. 6,361,275 (Wobben) discloses a wind turbine, wherein the pitch angles of each wind turbine blade can be adjusted independently such that corrections for varying wind speeds in the swept area of the wind turbine blades can be made. The wind speed often increases with the distance to the surface of the ground and it may thus be advantageous to adjust the lift power of the blades such that the load on the blade is substantially uniform during its entire rotation. However, this solution may also be used to compensate for other types of variations in the wind speed in the rotor plane.

The wind turbine according to U.S. Pat. No. 6,361,275 is, however, encumbered by the drawback that the adjustment cannot be made particularly fast, the conventional pitch hydraulics of the blade being used for this purpose. The hydraulics is not adapted for fast and almost instantaneous movements, since a wind turbine blade, whose dead load may exceed 10 tons, has a comparatively large inertia.

As mentioned above, particularly at large wind turbines, e.g. offshore wind turbines, the wind speed may vary greatly locally in the area swept by the rotor. The rotor may have a diameter of more than 120 meters, for which reason the wind speed may vary greatly due to local wind gusts and turbulence both in height and width.

U.S. Pat. No. 4,692,095 discloses a wind turbine blade according to the preamble to claim 1.

WO 2004/099608 also discloses a wind turbine blade according to the preamble of claim 1, wherein the size of the zone with reduced lift can be varied gradually by use of active flaps.

DISCLOSURE OF THE INVENTION

According to a first aspect, the object of the invention is to provide a wind turbine blade of the modern, aerodynamic type with improved regulating properties to enhance the adjustment of the wind turbine to various wind conditions, and where no mechanical parts are needed near the tip area.

In accordance with the invention, this object is obtained by the lift-regulating means being formed of at least one slot or a number of holes arranged in at least one longitudinally extending zone, thereby allowing an interior cavity of the blade to communicate with the exterior, and the lift-regulating means being adjustable by means of one or more activating means to regulate the amount of air emitted from the interior cavity to the exterior to alter the aerodynamic properties of the blade.

Thereby, a simple solution is provided for lowering or removing the lift of the longitudinally extending zone, at the same time lowering the load or bending moment at the hub. No mechanical parts are needed at the tip region of the blade in order to lower the lift of the tip region. Therefore, the blade according to the invention is in practice maintenance-free.

The wind turbine may operate at high wind speeds as the lift from the blade tip and inwards can be reduced as the wind speed increases. As a result, the turbine is operational at wind speeds above the so-called "cut-out wind speed", at which the turbine otherwise would have been stopped due to an excessive load. These options make it possible to provide a wind turbine with longer blades than usual, said blades being relieved of the load as the wind speed increases, whereby the operating range of the wind turbine as regards wind speed is increased. A considerable advantage is that the bending moment to which the blade root is subjected can be reduced. The forces acting on the outermost portion of the blade adjacent the blade tip have a comparatively heavy impact on the bending moment at the blade root, since the moment is given by distance times force, for which reason it is advantageous to reduce the lift in the outermost portion of the blade.

By lift-regulating means are meant means that in any way can lower the lift of the blade. Therefore, these means can also be stall-regulating means.

According to a preferred embodiment, the blade comprises a number of adjacent longitudinally extending zones, each comprising at least one slot or a number of holes. Thereby, it is possible to reduce the lift gradually along the longitudinal extent of the blade by reducing the lift of the individual zones, thereby also gradually lowering the load at the hub.

According to another preferred embodiment, the longitudinally extending zone is provided at the aerodynamic pressure side of the blade. This provides the most efficient way of reducing the lift.

According to yet another preferred embodiment, the at least one slot or group of holes are provided near the trailing edge of the blade. Thereby, the function of the slots or holes corresponds to the function of an active flap arranged at the trailing edge of the blade.

Alternatively or in addition thereto, the slots or holes can be provided at the leading edge of the blade, thereby being adapted to altering the stall properties of the blade. Such means promote the stall tendency of the blade, i.e. the formation of separated air flows on the aerodynamic suction side of the blade, whereby the lift is reduced.

According to one embodiment of the blade, the slots or group of holes each are angled between 0 and 90 degrees compared to the tangent line of the envelope of the blade, or between 5 and 60 degrees or between 10 to 45 degrees. These angles provide the best performance for reducing the lift. The lift reduction also depends on the pressure or velocity of the emitted air. In general it will be preferred to have as low an emitting angle as possible in order to keep the aerodynamic resistance or drag as low as possible. However, in this case the emission pressure should be relatively high in order to achieve the desired lift reduction.

According to another embodiment of the blade, the longitudinally extending zones comprise a number of slots or holes, which have different angles compared to the tangent line of the envelope of the blade. For instance, every second hole can be angled in a first angle, whereas the rest are angled in a second angle. If the blade is adapted to only emit air through the holes having the first angle or the holes having the second angle or both sets of holes or not emitting air at all, the lift-regulating means can take four different settings, thereby functioning similar to an active flap.

Alternatively, the slots can all be angled in the same angle, but the emission of air can be controlled separately. For instance, every second hole can be controlled by first activation means, whereas the rest are controlled by second activation means. Thereby, the lift can be lowered gradually in each zone.

According to a preferred embodiment, the lift-regulating means are adjustable by use of pressurised air. Thereby, a simple method for rapidly reducing the lift of the blade tip and thus also the load at the hub is obtained. The activating means can in this case for instance be an air compressor.

According to another preferred embodiment, the activating means are one or more valve means. Thereby, an alternative method for rapidly changing the load at the hub is provided.

According to yet another preferred embodiment, the blade comprises an air intake communicating with the interior of the blade. Preferably, the intake is provided at the root end of the blade. Thereby, air drawn into the interior cavity of the blade near the root area is therefore directed in the longitudinal direction of the blade inside the interior cavity due to the centrifugal force from the rotor movement, and the air is emitted via the at least one slot or group of holes. Thereby, the lift of the blade can be altered passively using the centrifugal force of the blade only.

According to a preferred embodiment of the blade, the interior cavity of the blade comprises a number of individual cavities, each communicating with the exterior via separate slots or groups of holes, which are provided in separate longitudinal sections of the longitudinal direction of the blade. Each of these cavities can be provided with a separate valve means. Thereby, the lift of the individual longitudinal sections can be altered separately by opening the corresponding valve member. The individual cavities can be formed by separating walls. Alternatively, the cavities can be formed by tubes or similar, for instance connected to an air compressor.

According to a particular embodiment of the blade, the valve members are adapted to open automatically, when the rotational velocity of the rotor exceeds a predetermined value. The centrifugal force may for instance be sufficient to open the valves, when the centrifugal force exceeds a certain value.

Alternatively, the blade comprises load sensors arranged in or on the blade and measuring wind loads in form of for instance wind pressure or strain. These sensors may suitably be used to adjust the lift-regulating means.

According to an advantageous embodiment, the blade comprises a control system with a control unit connected with the activating means and the load sensors, so that the control unit may activate the activating means and thus adjust the amount of air emitted via the at least one slot or groups of holes in accordance with the measurements mad by the load sensors. Such a wind turbine blade may thus be "automatically controlled" in that it per se adapts its lift according to the load and thus requires no external control.

According to a particularly advantageous embodiment of the blade, the control system is adapted so that it can be linked with other corresponding blades on the same wind turbine to allow activation of the activating means on the basis of the load measurements from one or more of the other blades. As a result, for instance when the turbine is hit by a wind gust, the blade may more easily attain optimum lift properties based on the load data received from another blade before it is subjected to the loads to which the other blade just has been subjected. In a typical situation the blades are subjected to wind speeds, which are higher when they are in the upper portion of the rotor plane during their rotation than when they are in the lower portion of the rotor plane. A blade may thus receive data from an upwardly facing blade and make adaptation before it per se reaches its upward position during rotation. At yaw errors, i.e. when the nacelle is not adjusted in the optimum manner in relation to the wind direction, the blades are also subjected to loads, which vary according to their position in the rotational plane. Such varying loads may also be compensated by means of the blade according to the invention.

A second aspect of the invention relates to a wind turbine rotor having a number of such wind turbine blades, preferably two or three, said wind turbine rotor including a central control system with a control unit, e.g. built-in in the rotor hub, and connected with the load sensors and activating means of each blade to allow the control unit to adjust the amount of air emitted via the at least one slot or groups of holes of one or more of the blades based on the load measurements from each blade and/or the setting of lift-regulating means.

The blade is preferably fabricated as a shell element, the holes or slots thus being formed in the shell wall.

The invention also relates to a wind turbine comprising the above wind turbine blades or the above rotor. Preferably, the wind turbine has a near horizontal rotor shaft.

The method is particularly suitable for controlling a wind turbine having pitch-controlled blades and wherein the rotational speed of the blades is kept substantially constant.

BRIEF DESCRIPTION OF THE DRAWINGS

The invention is explained in greater detail below with reference to the drawings illustrating embodiments of the invention and in which.

DETAILED DESCRIPTION OF THE INVENTION

Figure 1:
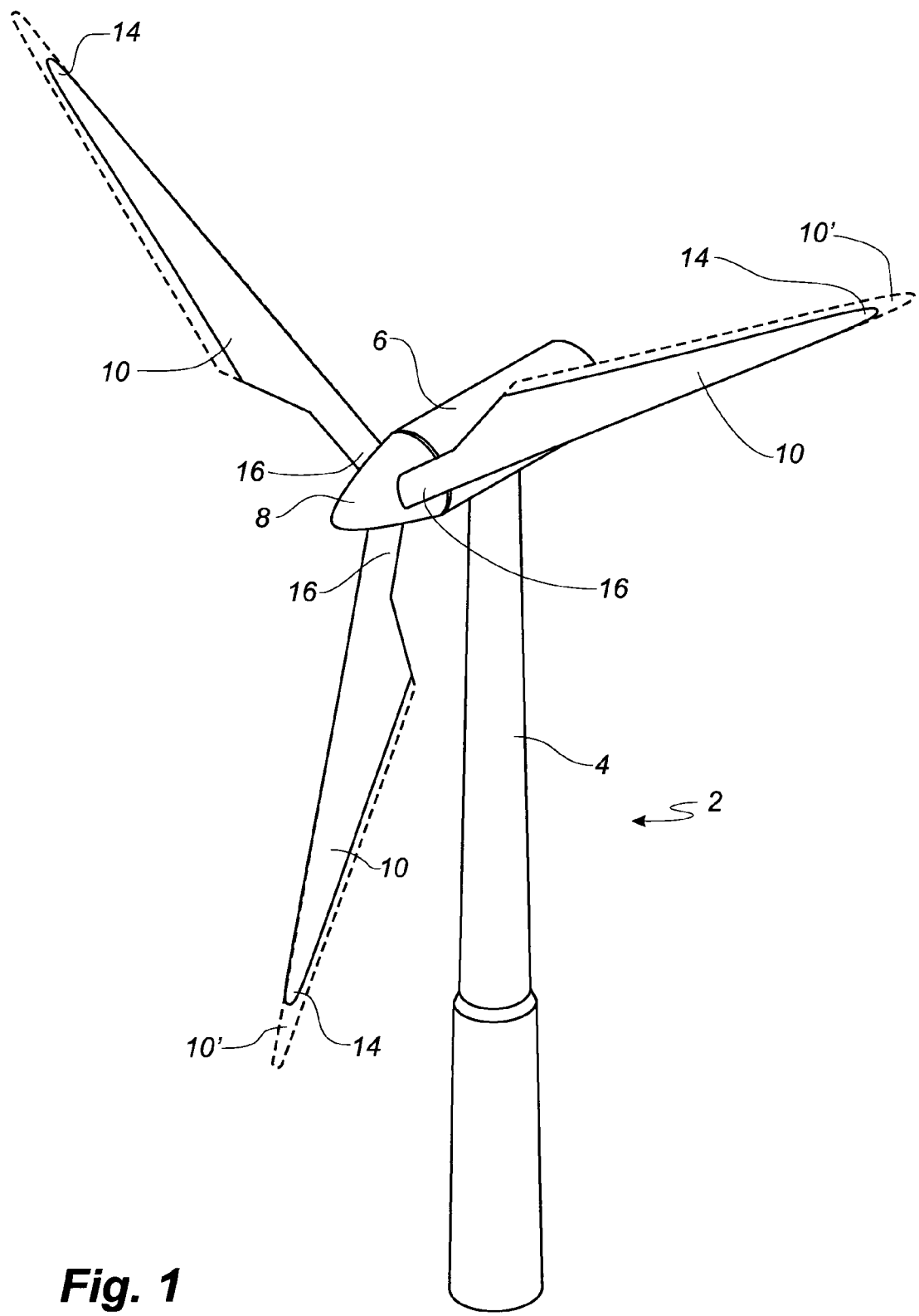
FIG. 1 shows a wind turbine.

FIG. 1 illustrates a conventional modern wind turbine with a tower 4, a nacelle 6 and a rotor including a hub 8 and three blades 10 extending from the hub 8. The blades 10 may be provided with lift-regulating means, which by activation of the activating means at high wind speeds can gradually reduce the lift of the blade in a zone extending from the blade tip 14 to a position between the blade tip and the blade root 16. As a result, at high wind speeds the blade 10 is relieved in a zone extending from the blade tip 14 and inwardly towards the root 16 such that a wind turbine 2 with a given blade 10 can remain in operation at higher wind speed than usual. The invention also renders it possible to provide a wind turbine 2 with longer blades 10' than usually, said blades merely being relieved by the lift-regulating means at increasing wind speeds and thus at increasing loads such that an overloading of the turbine and the blade is prevented.

Figure 2:
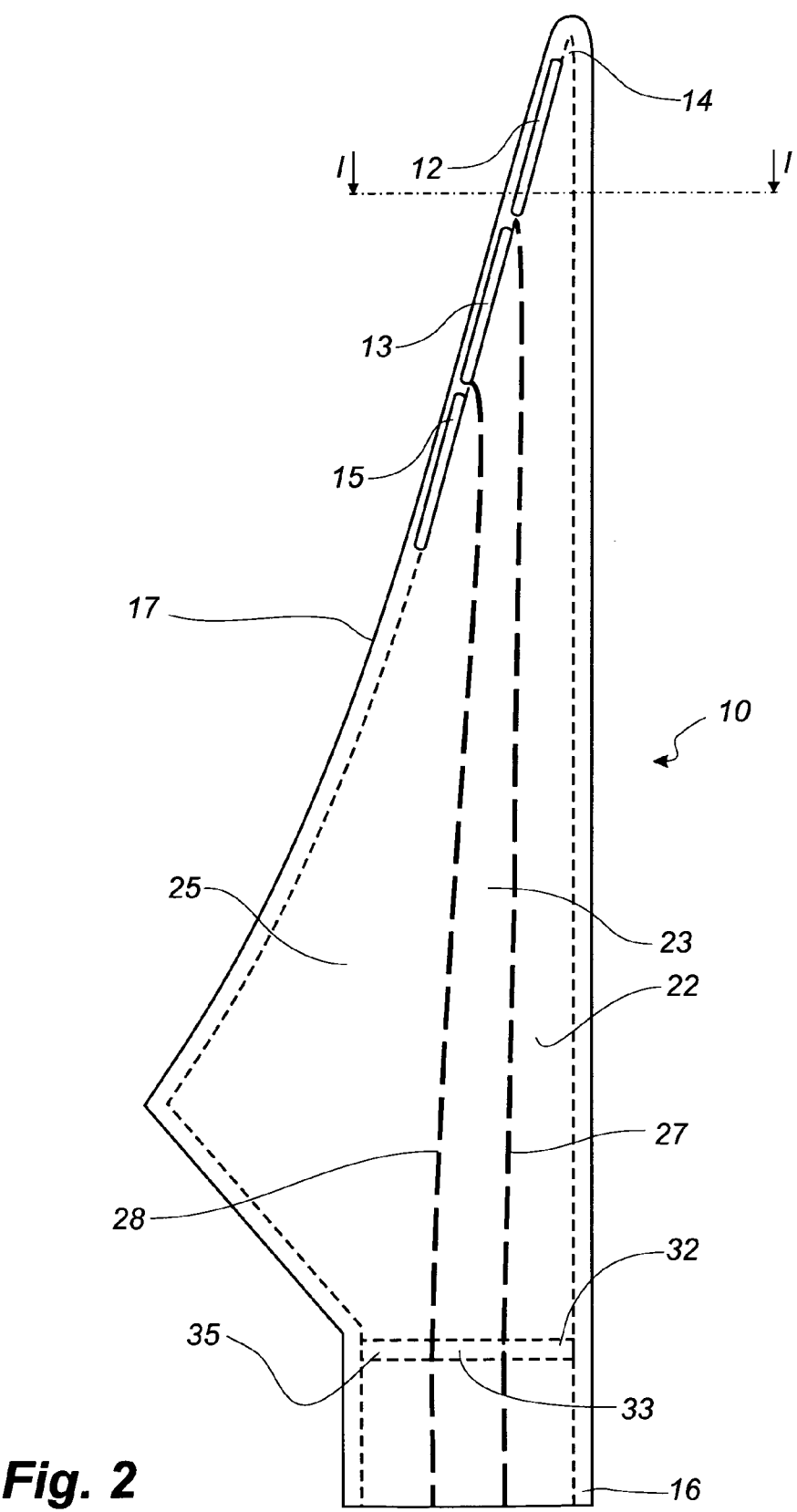
FIG. 2 is a schematic view of a first embodiment of a blade according to the invention.

FIG. 2 shows a schematic view of a first embodiment of a wind turbine blade according to the invention. The blade 10 comprises three elongated slots 12, 13, 15. A first slot 12 is placed near the tip 14 of the blade. The first slot is connected to a first internal cavity 22 or first air reservoir, which thereby can communicate with the exterior of the blade. A first valve means 32 is arranged within the first cavity 22. A second slot 13 is placed adjacent the first slot 12. The second slot 13 is connected to a second internal cavity 23 or second air reservoir, which thereby can communicate with the exterior of the blade. A second valve means 33 is arranged within the second cavity 23. A third slot 15 is placed adjacent the third slot 15. The third slot 15 is connected to a third internal cavity 25 or third air reservoir, which thereby can communicate with the exterior of the blade. A third valve means 35 is arranged within the third cavity 25. The first 22 and the second 23 cavity are separated by a first separating wall 27, and the second 23 and the third 25 cavity are separated by a second separating wall 28.

The blade 10 comprises an intake in the root area 16. The intake is preferably arranged so that air is drawn in through the hub, but the intake can also be arranged as for instance a slot in the root area 16.

Figure 3:
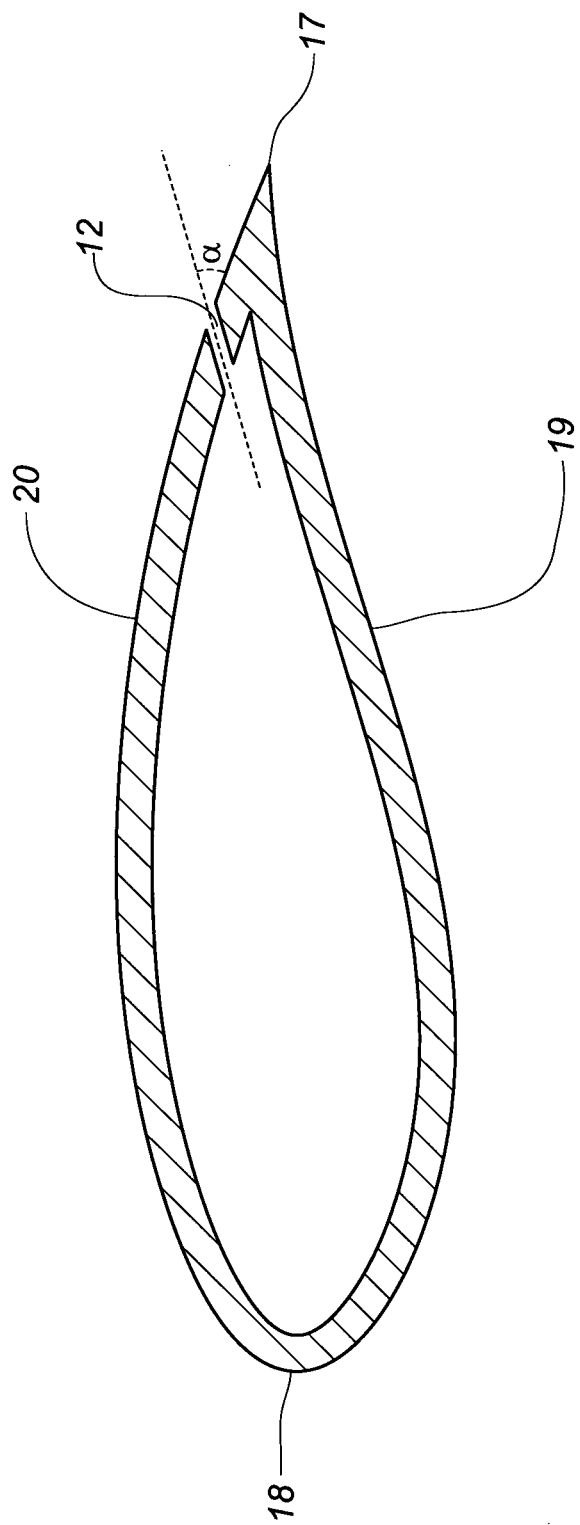
FIG. 3 is a cross section along the line I-I in FIG. 2.

FIG. 3 shows a cross-section through the blade along the line I-I in FIG. 2. The blade 10 comprises a leading edge 18 and a trailing edge 17, a pressure side 20, and a suction side 19. As seen, the slots 12 are arranged at the pressure side 20 near the trailing edge 17 of the blade. The slot 12 is angled with the angle □ compared to the tangential line of the envelope of the blade. By emitting air through the slot 12, the aerodynamic properties of the blade are changed and the lift can be significantly reduced. Therefore, the slots functions as lift-regulating means. The slot can also be arranged so that it emits air exactly at or in the close vicinity of the trailing edge 17. In this case, the slot should preferably be angled in an upward angle compared to the chord line extending between the trailing edge 17 and the leading edge 18.

By opening the first valve means 32, air is drawn in via the hub (or the intake slot near the root 16) and is moved in the longitudinal direction of the blade 10 due to the rotational force from the rotor movement. Due to the rotational force, the air pressure in the internal cavity will also increase in the longitudinal direction of the blade. As a consequence an overpressure builds up, and the air is emitted through the first slot 12, thereby reducing the lift in the longitudinally extending region in which the first slot 12 is arranged. Similarly, the lift in a second longitudinally extending region can be reduced by opening the second valve means 33, and the lift can be reduced a third longitudinally extending region by opening the third valve means 35. Thereby, the lift can be reduced gradually along the longitudinal direction of the blade.

The blade may additionally comprise holes or slots near the leading edge 18 of the blade 10. Such leading edge holes can function as stall-generating means.

Figure 4:
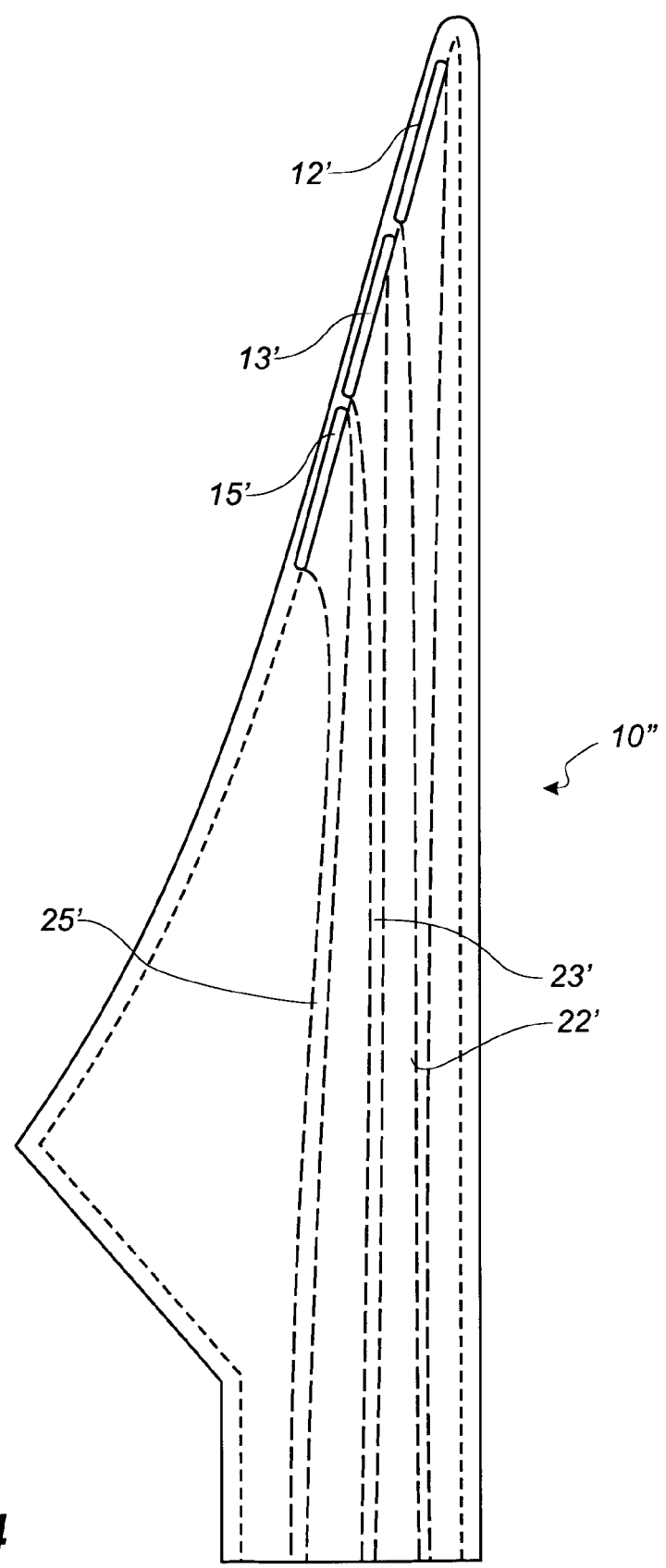
FIG. 4 is a schematic view of a second embodiment of a blade according to the invention.

FIG. 4 shows a second embodiment of a blade according to the invention. The blade 10" of the second embodiment corresponds to the first embodiment shown in FIG. 2 with the exception that the cavities are replaced by air tubes, so that a first tub 22" is connected to a first slot 12", a second tube 23" is connected to a second slot 23", and a third tube 25" is connected to a third tube 25". The tubes may optionally be connected to the slots via air reservoirs formed near the slots.

It is advantageous that the lift of the different longitudinally extending regions can be reduced relatively fast, especially if the lift has to be adjusted one or more times for each rotation of the wind turbine blade. Therefore, the tubes can in the other end be connected to an air compressor. Thereby, the emission of air can quickly be turned on or off. The passive solution using valve means and the rotational force for emission of air is also sufficient to achieve this effect. However, using an air compressor has the additional advantage, that the velocity of emitted air can be regulated, thereby the lift reduction can be controlled even further.

Figure 5:
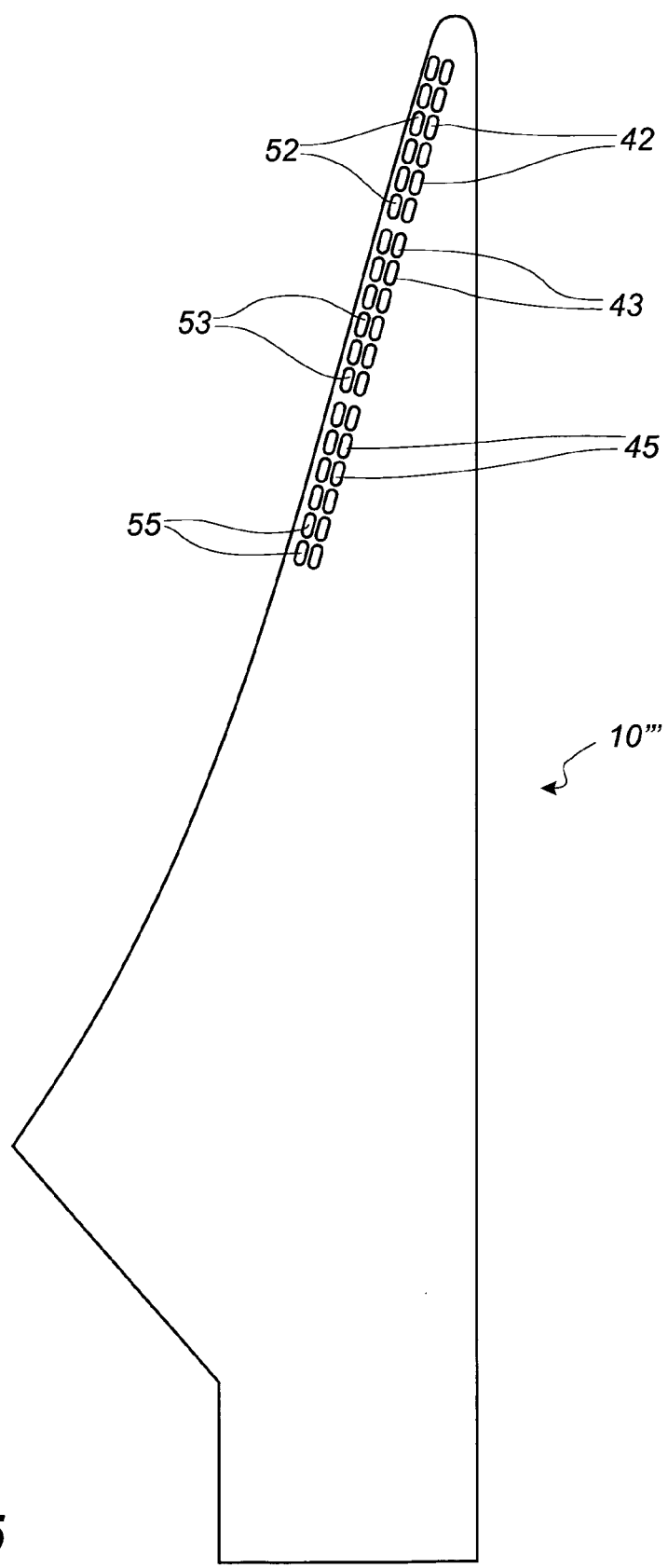
FIG. 5 is a schematic view of a third embodiment of a blade according to the invention.

FIG. 5 shows a third embodiment of a blade 10''' according to the invention. Instead of slots, the lift-regulating means are formed by groups of holes 42, 43, 45, 52, 53, 55, so that a first longitudinally extending zone comprises a group of first holes 42 and a group of second holes 52, a second longitudinally extending zone comprises a group of first holes 43 and a group of second holes 53, and a third longitudinally extending zone comprises a group of first holes 45 and a group of second holes 55.

The first groups of holes and second groups of holes can be connected to separate air reservoirs or tubes. Thereby, it is possible to reduce the lift to a first setting by emitting air through the first group of holes, reduce the lift to a second setting by emitting air through the second group of holes, and to a third setting by emitting air through both group of holes. Thus, it is possible to reduce the lift gradually in the different longitudinally extending zones.

However, the groups of holes can also be arranged in single rows. In this case, it can also be possible to reduce the lift gradually in the different zones by letting for instance every second hole be connected to separate air reservoirs or tubes.

Figure 6:
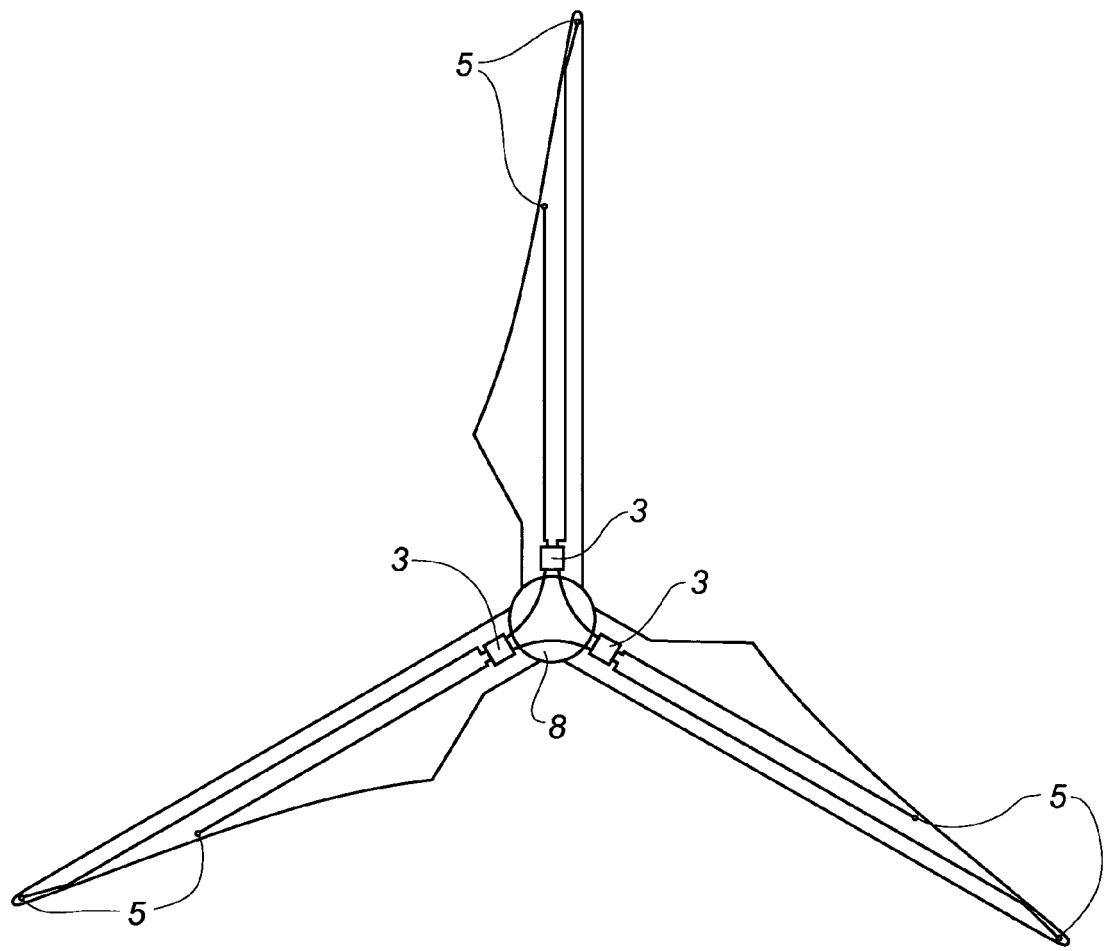
FIG. 6 is a schematic view of a wind turbine rotor with a control system.

FIG. 6 is a schematic view of a rotor with a hub 8 and three wind turbine blades according to the invention extending from the hub 8. Each blade is provided with a control system including an electronic control unit 3 connected to the activating means of the lift-regulating means 12, 13, 15, i.e. for instance controlling valve means or an air compressor. The control unit 3 is further connected to load sensors 5 measuring the load on the wind turbine blade. The load sensors 5 may for instance be strain gauges mounted on the inner face of the blade shell or a bracing interconnecting the inner faces of the blade shell and thus measures the strain caused by the wind load. Optionally pressure gauges measuring the wind pressure on the blade may be used as load sensors.

As evident in FIG. 6, the control units 3 of each blade may be interconnected such that data about the load on a first blade or the lift setting thereof is transmitted to the other blades. As a result the lift regulating means 12, 13, 15 thereof can be adjusted to the wind action to which they are subjected, when they adopt the position of the first blade during rotation.

The control systems of the blades may be interconnected in such a manner that a single control unit 3 controls all of the lift-regulating means of the blades 10. This control unit 3 may be placed in one of the blades, in the hub, in the nacelle, in the turbine tower 4 or outside of the turbine.

Figure 7:
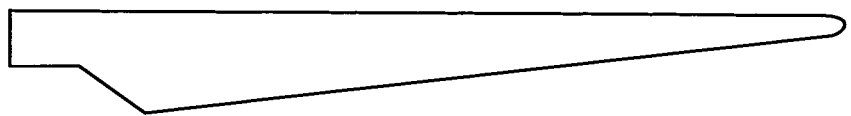
FIG. 7 is a side view of a wind turbine blade.
Figure 8:
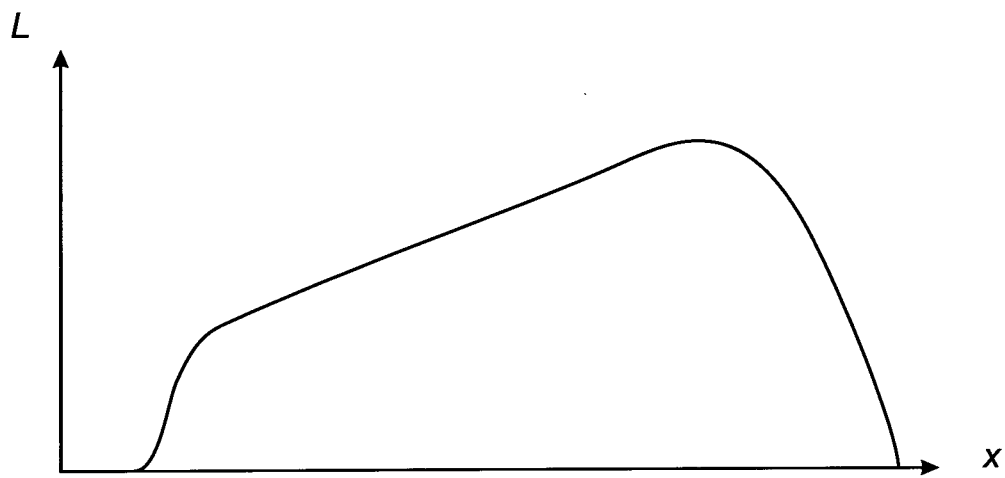
FIG. 8 is a graph showing the lift of a wind turbine blade profile as a function of the distance to the blade root.

FIG. 7 is a side view of a wind turbine blade. FIG. 8 shows a graph diagrammatically illustrating the lift L of the blade as a function of the distance X from the blade root. The lift of the blade thus increases gradually along the blade and decreases to 0 at the blade tip.

Figure 9:
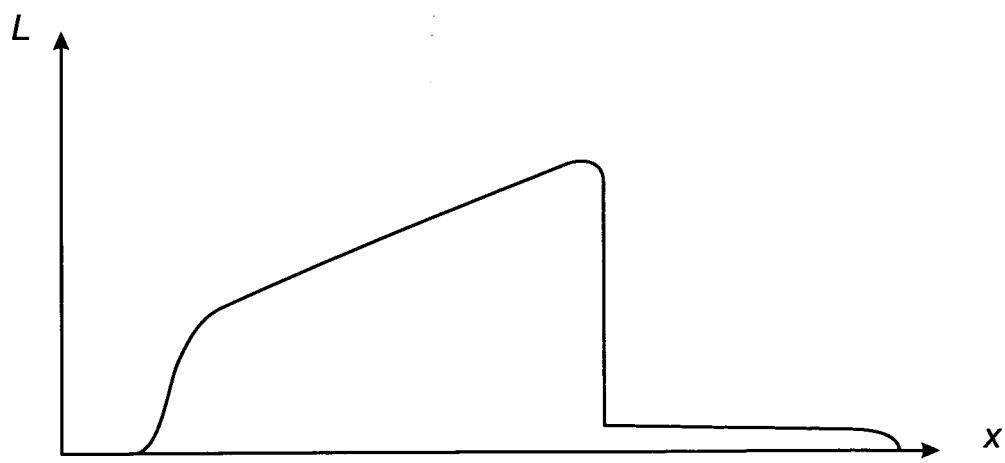
FIG. 9 is a graph as the one shown in FIG. 8, the lift here being reduced in a zone along an outer portion of the blade.

FIG. 9 illustrates a situation, in which the lift-regulating means 12, 13, 15 are activated along an outer zone of the blade. In this zone the lift has been reduced to nearly 0. The length of this zone is adjustable depending on the wind load, the abrupt transition can be moved inwards towards the blade root—to the left in FIG. 9—or outwards towards the blade tip—to the right in FIG. 9. The lift-regulating means and the activating means may be formed and/or adjustable such that the lift is gradually reduced in the direction towards the blade tip. By using a number of stepwise adjustable settings, the graph in the activated zone may be shaped as a flight of steps.

In addition to wind speed registrations and strain measurements, power output data from the generator in the nacelle may also be used to adjust the lift-regulating means.

Wind predictions may also be performed using the solution described in WO 98/42980, in which the wind speed at a certain distance in front of the wind turbine is measured by means of laser equipment. This method is advantageously combined with the flaps described above, the blades thus being "ready" when the predetermined wind situation occurs in the rotor plane.

The method of adjusting the aerodynamic properties of the blades described above makes it easier—particularly with pitch-controlled wind turbines—to maintain a substantially constant rotational speed even if the wind turbine is affected by wind gusts, e.g. due to turbulence, and other variations in the wind speed. Furthermore, the load on the blades is significantly more uniform in that variations in the speed profile of the wind can be part of the regulating parameters such that corrections for wind variations in the rotor plane can be made. It is also possible to make corrections for the wind shade exerted by the wind turbine tower on the rotor.

The invention may be used in connection with stall-controlled wind turbines with a constant speed of revolution and in connection with wind turbines with a varying speed of revolution. The invention is, however, particularly advantageous when used to operate pitch-controlled wind turbines with a substantially constant rate. The cost of the expensive electric components required for converting the alternating current of varying frequency generated by wind turbines with variable rotational speed to an alternating current of constant frequency is thus saved.

LIST OF REFERENCE NUMERALS 2 wind turbine
3 control unit
4 tower
5 load sensor
6 nacelle
8 hub
10 blade
12 first slot
13 second slot
14 blade tip
15 third slot
16 blade root
17 trailing edge
18 leading edge
19 suction side
20 pressure side
22 first cavity/first air reservoir
23 second cavity/second air reservoir
25 third cavity/second air reservoir
22' first tube
23' second tube
25' third tube
27 first separating wall
28 second separating wall
32 first valve means
33 second valve means
35 third valve means
42 first holes of first longitudinally extending zone
43 first holes of second longitudinally extending zone
45 first holes of third longitudinally extending zone
52 second holes of first longitudinally extending zone
53 second holes of second longitudinally extending zone
55 second holes of third longitudinally extending zone

The invention claimed is:

1. A blade (10) for a wind turbine rotor with a hub,
the blade extending in a longitudinal direction along a longitudinal axis and having a root area (16) closest to the hub and a tip region furthest away from the hub,
the blade (10) along at least a portion of the longitudinal direction of the blade having an envelope, which defines an airfoil profile having, in normal operation, a pressure side (20) and a suction side (19), and further having a leading edge (18) and a trailing edge (17), which edges define an airfoil chord line extending between them,
the blade (10) including adjustable lift-regulating means extending in the longitudinal direction of the blade (10), and
activating means by means of which the lift-regulating means can be adjusted and thus alter the aerodynamic properties of the blade (10),
the lift-regulating means being adapted so that by activation of the activating means, the lift can be reduced in a zone extending in the longitudinal direction of the blade (10) from a first position in proximity to the blade tip (14) to a second position between the first position and the root area (16) and this second position being variable in the longitudinal direction of the blade, characterised in that
the lift-regulating means are formed of a plurality of adjacent longitudinally extending zones arranged from the tip region of the blade towards the root area on the trailing edge of the blade, each zone comprising at least one slot (12, 13, 15) or a number of holes (42, 43, 45, 52, 53, 55), each zone being controlled by a separate interior cavity, thereby allowing the interior cavity (22, 23, 25) of the blade (10) to communicate with the exterior, and the lift-regulating means being adjustable by means of one or more activating means to regulate the amount of air emitted from the interior cavity (22, 23, 25) to the exterior to alter the aerodynamic properties of the blade (10) such that when the activating means are activated, the lift is minimized.

2. A blade according to claim 1, wherein the longitudinally extending zone is provided at the pressure side (20) of the blade (10).

3. A blade according to claim 1, wherein the at least one slot or group of holes are provided near the trailing edge (17) of the blade.

4. A blade according to claim 1, wherein the lift-regulating means are adjustable by use of pressurised air.

5. A blade according to claim 1, wherein the activating means are one or more valve means (32, 33, 35).

6. A blade according to claim 5, wherein the valve members (32, 33, 35) are adapted to open automatically, when the rotational velocity of the rotor exceeds a predetermined value.

7. A blade according to claim 1, wherein the blade comprises an air intake communicating with the interior (22, 23, 25) of the blade (10).

8. A blade according to claim 7, wherein the intake is provided at the root area (16) of the blade (10).

9. A blade according to claim 1, wherein the interior cavity of the blade comprises a number of individual cavities (22, 23, 25), each communicating with the exterior via separate slots (12, 13, 15) or groups of holes (42, 43, 45, 52, 53, 55), which are provided in separate longitudinal sections of the longitudinal direction of the blade.

10. A blade according to claim 1, wherein the blade comprises load sensors (5) arranged in or on the blade (10) and measuring wind loads in form of for instance wind pressure or strain.

11. A blade according to claim 10, wherein the blade (10) comprises a control system with a control unit (3) connected with the activating means and the load sensors (5), so that the control unit may activate the activating means and thus adjust the amount of air emitted via the at least one slot or groups of holes in accordance with the measurements made by the load sensors (5).

12. A blade according to claim 11, wherein the control system is adapted so that it can be linked with other corresponding blades on the same wind turbine to allow activation of the activating means on the basis of the load measurements from one or more of the other blades.

13. A wind turbine rotor with a plurality of wind turbine blades (10), according to claim 12, said wind turbine rotor including a central control system with a control unit (3), in the rotor hub (8), and connected with the load sensors (5) and activating means of each blade (10) to allow the control unit (3) to adjust the amount of air emitted via the at least one slot or groups of holes of one or more of the blades based on the load measurements from each blade and/or the setting of lift-regulating means.

14. A wind turbine comprising wind turbine blades according to claim 1.

15. A method of controlling a wind turbine according to claim 14, wherein the second position between the first position and the blade root (16) is varied in the longitudinally direction of the blade (10) by adjusting the activating means on the basis of measured loads or measured wind speeds.

16. A method according to claim 15, wherein the blades (10) are pitch-controlled and wherein the rotational speed of the blades is kept substantially constant.

17. The blade of claim 1, wherein each longitudinally extending zone starting from the tip region of the blade is arranged successively away from the leading edge of the blade from a previous adjacent longitudinally extending zone.

* * * * *